United States Patent [19]

Spisak

[11] 4,270,805
[45] Jun. 2, 1981

[54] WHEEL AND HUB CAP ASSEMBLY

[76] Inventor: Edward G. Spisak, 35700 Oakwood La., Westland, Mich. 48185

[21] Appl. No.: 27,871

[22] Filed: Apr. 6, 1979

[51] Int. Cl.$^3$ .............................................. B60B 7/06
[52] U.S. Cl. ............................ 301/37 TP; 301/108 R
[58] Field of Search .............. 301/37 R, 37 P, 37 TP, 301/37 PB, 37 B, 108 R, 108 A; 220/307

[56] References Cited

U.S. PATENT DOCUMENTS

| 681,666 | 8/1901 | Call | 301/108 R |
|---|---|---|---|
| 3,262,602 | 7/1966 | McConnell et al. | 220/307 |
| 3,823,982 | 7/1974 | Spisak | 301/37 P |
| 3,998,494 | 12/1976 | Spisak | 301/37 P |

FOREIGN PATENT DOCUMENTS 650939 10/1928 France .................................. 301/108 R Primary Examiner—Charles A. Marmor
Attorney, Agent, or Firm—Fisher, Gerhardt, Crampton & Groh

[57] ABSTRACT

A wheel and hub cap assembly wherein a cast metal wheel has a hollow hub portion housing the wheel mounting holes receiving studs to secure the wheel of a vehicle with the hub portion forming an annular groove opening radially inwardly relative to the axis of the wheel to receive a hub cap covering the opening. The hub cap has radially extending retaining elements complementary to the groove to support the hub cap relative to the wheel and limit axial inward and outward movement with the retaining elements being substantially the only contact between the wheel and hub cap.

7 Claims, 3 Drawing Figures

WHEEL AND HUB CAP ASSEMBLY

This invention relates to vehicle wheels and more particularly to a cast metal wheel and hub cap assembly.

In the past, cast metal wheels have been relatively expensive when compared to steel wheels and as a consequence composite wheels of steel with a plastic face have been used to simulate the more expensive cast wheels at a low cost. Wheel trim such as hub caps or grease caps used with simulated cast wheels can be connected together as disclosed in my U.S. Pat. No. 3,823,982 granted July 16, 1974. Greater emphasis is now being placed on vehicle weight than on cost and cast wheels are gaining favor. The problems of connecting hub caps to cast metal wheels differs from connecting hub caps to simulated cast wheels because of such factors as the greater ridigity of the cast wheels as compared to the plastic face on steel wheels and because of the thicker sections of cast wheels as compared with steel wheels. In the past hub caps used with cast metal wheels have required fasteners such as screws or bolts or the like.

It is an object of the invention to provide a cast metal wheel and hub cap combination in which the hub cap is attached to the wheel without employing separate fasteners.

Another object of the invention is to provide a cast metal wheel and hub cap combination wherein the wheel has specially formed guide surfaces to gradually deflect the hub cap into an attaching position.

Still another object of the invention is to provide such a wheel and hub cap combination wherein the hub cap is retained on the wheel in which the contact between the hub cap and wheel occurs in a groove formed in the wheel and the remaining surfaces of the hub cap and wheel remain in close but spaced relationship to each other.

The objects of the invention are accomplished by wheel and hub cap assembly in which a cast metal wheel includes a tire mounting rim and a hub portion with wheel mounting holes uniformly spaced on a circle coaxially with the wheel. The hub portion and rim are joined together by a generally disc shaped spider portion. The hub portion is formed with an axially extending recess with inner walls extending radially outwardly of the bolt circle. An annular groove for receiving retainers on the hub cap is formed in the recess and opens radially inwardly relative to the axis of the wheel. The groove is disposed between the outboard end of the recess and the ends of the studs in the wheel mounting openings. The entrance to the recess is closed by the hub cap and the cap is formed with spaced retaining elements adapted to be disposed in the groove. A guide surface is formed in the recess between the groove and the outer end of the recess to engage the retaining elements on the hub cap and gradually deflect them radially inwardly upon axially movement of the cap relative to the wheel. The groove also is formed with an axially inner and outer portions which engages the retaining elements to form a stop limiting inward and outward movement of the hub cap relative to the wheel.

These and other objects of the invention will be apparent from the following description and from the drawings in which.

Figure 1:
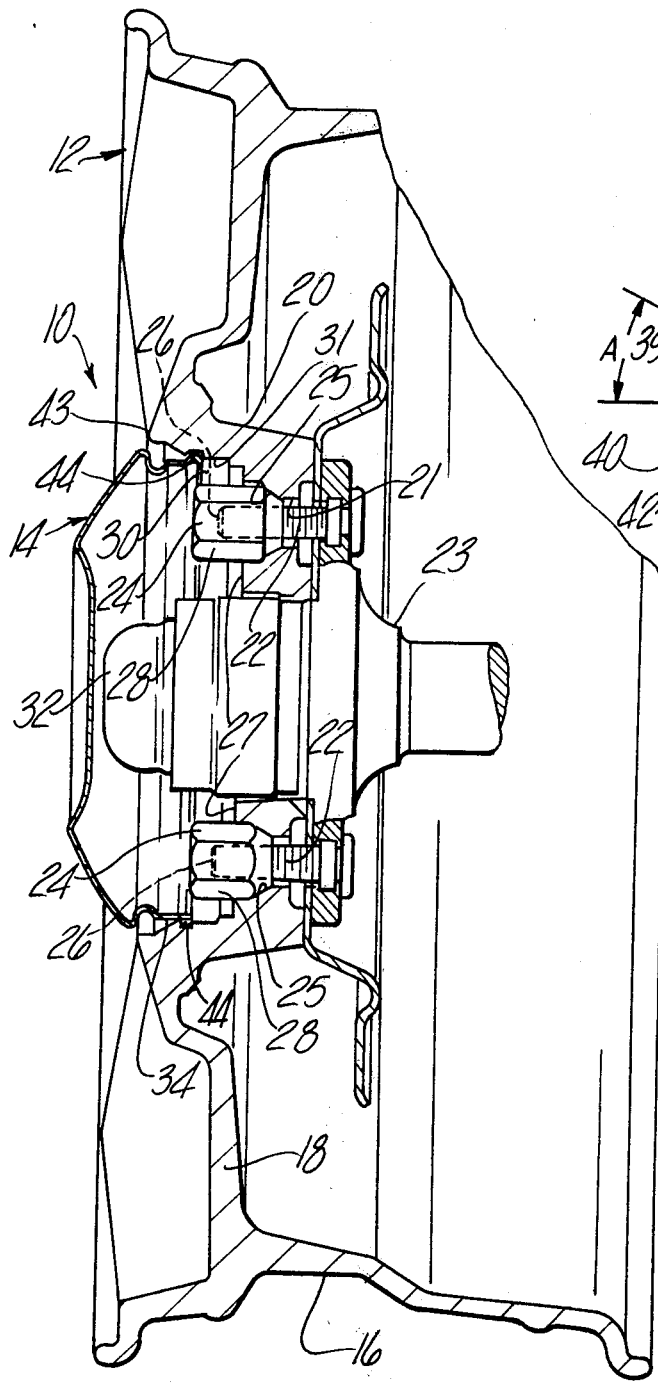
FIG. 1 is a cross-sectional view of a wheel and hub cap embodying the present invention.

Referring to FIG. 1, the wheel and grease cap assembly 10 embodying the invention includes a wheel 12 and a hub cap 14. The wheel 12 includes a tire receiving rim 16 formed integrally with a radially inwardly extending wheel disc or spider 18. The spider 18 is formed integrally with a hub portion 20. The rim 16, spider 18 and hub portion 20 are cast as a unit, preferably of a metal such as aluminum, for example. After casting, most of the wheel surfaces are machined to provide the various tire engaging and hub cap receiving surfaces and also to provide a decorative finishes to various portions of the outboard side of the wheel 12. As a result, the cast wheel has more accurately controlled dimensions than conventional steel wheels.

The hub portion 20 of the wheel 12 has a plurality of holes 21 which are adapted to receive bolts or studs 22 by which the wheel 12 is secured to the vehicle axle structure indicated at 23. The studs 22 and consequently the matching holes 21 are uniformly spaced on a circle coaxial with the axis of the axle structure 23. In the mounted position of the wheel 12, nuts 24 on the studs 22 act to hold a wheel 12 in position. The holes 22 have a beveled seat 25 which is complementary to a seat on the nuts 24. The beveled seat 25 has a greater surface area than found in steel vehicle wheels to form the necessary bearing surface for the nuts 28. The hub sections of the cast wheel 12 are thicker than steel wheels to provide the necessary strength. Consequently, when cast wheels are used with studs 22 which might also receive steel wheels, the ends 26 of the studs 22 terminate a short distance axially outwardly of the hub surface 27. In order to form easily accessible wrench receiving surfaces 28, the nuts 24 are elongated to project axially outwardly of the hub surface 27.

The hub portion 20 forms a recess 30 which extends axially outwardly beyond the ends of the studs 22 and nuts 24 with generally cylindrical stepped walls 31 disposed radially outwardly of the bolt circle formed by the studs 22 and nuts 24.

The recess 30 is closed by the hub cap 14 which serves the purpose of housing and concealing not only the studs 22 and nuts 24 but also the grease cap 32 mounted at the end of the axle structure 23.

Figure 3:
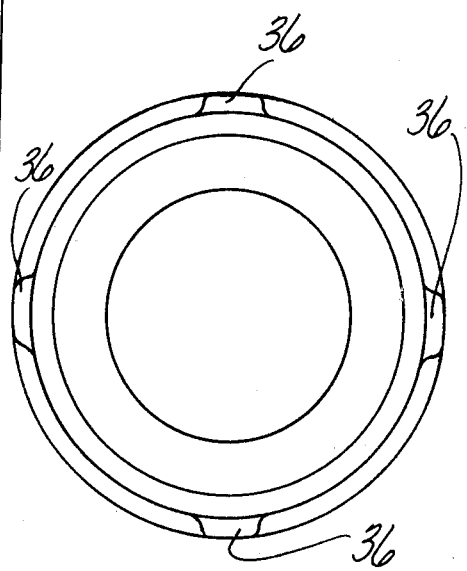
FIG. 3 is a rear plan view of the hub cap detached from the wheel.

The hub cap 14 is generally cup shaped and has an axially extending flange 34 at its open end. The flange 34 is provided with a plurality of retaining portions 36 which are uniformly spaced apart. Preferably the number of retaining portions 36 is at least three but as shown in FIG. 3, four such retaining portions 36 are illustrated in diametrically opposed relationship to each other. The retaining portions are formed by pressing out localized areas of the flange 34 so that a radially outwardly curved surface is formed, the opposite surface of which forms the bottom of a groove opening radially inwardly of the axis of the wheel.

Figure 2:
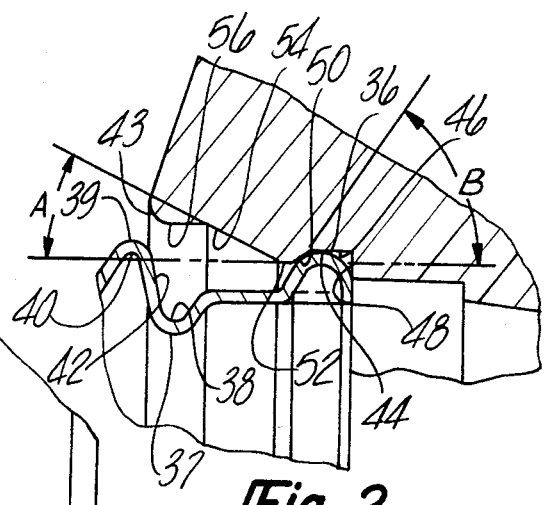
FIG. 2 is a cross-sectional view of a portion of the wheel and hub cap seen in FIG. 1, but at a greatly enlarged scale.

As seen in FIG. 2, the flange 34 merges with a radially inwardly extending bead 37 forming an annular groove 38 opening radially outwardly of the wheel. The hub cap has a radially outwardly extending bead 39 forming another groove 40 opening radially inwardly. The bead 39 projects radially outwardly from the flange 34 a distance approximately equal to the radial outer extent of the retaining elements 36. The two beads 37 and 39 and corresponding grooves 38 and 40 form a generally S-shaped configuration which provides a relatively wide annular wall 42 forming a tool engaging surface. The oppositely extending beads 37 and 39 make it possible to form a wider tool engaging surface than would otherwise be possible since in the formation of the hub cap 14 the metal becomes thinner as it is displaced radially outwardly and tends to gather together as it is displaced radially inwardly. The adjacent relatively shallow grooves 38 and 40 therefore form a relatively wide tool engaging surface adjacent to the lip 43 at the entrance to the recess 30.

The hub cap 14 is held in position relative to the wheel 12 when the retaining portions 36 are seated in a retaining groove 44 formed in the hub portion 20 of the wheel 12. As best seen in FIG. 1, the retaining groove 44 is formed axially outwardly of the ends of the studs 22 and stud receiving holes 22 and axially inwardly of the outer end of the recess 30 as defined by the lip 43. The bottom 46 of the groove 44 is generally cylindrical and coaxially with the axle structure 26. An inboard edge of the retaining groove 44 as defined by the wall 48 is deeper than the outboard edge of the groove as defined by the guide wall 50. The inboard wall 48 of the retaining groove 44 is an annulus with the surface normal to the axis of the wheel and the outboard guide wall 50 is formed at an angle to facilitate movement of the retaining portions 46 out of the retaining groove 44. The outboard guide surface 50 merges with short cylindrical surface 52 which in turn merges with a frusto-conical guide surface 54. The guide surface 54 merges with a generally cylindrical surface indicated at 56, the outer edge of which is formed by the lip 43.

The hub cap 14 is so formed that the retaining portions 36 have a maximum radius no greater than the radius of the cylindrical surface 56. Also, the guide surface 54 is shaped to form a gradual incline from the cylindrical surface 56 to the surface 52. In actual practice the angle indicated at A in FIG. 2 is formed at about twenty-five degrees with the axis of the wheel.

When the hub cap 14 is attached to the wheel 12, it is moved axially so that the retaining portion 36 come into contact with the guide surface 54. Continued axial movement gradually deflects the retaining portion 36 radially inwardly. At the same time portions of the flange 34 between the retaining portions 36 are deflected or bowed radially outwardly. When the retaining portions 36 reach the surface 52 they have been deflected to their maximum amount. Additional axial inward movement of the hub cap 14 causes retaining portions 46 to drop into the retainig groove 44. In that position, as seen in FIG. 2, the inward end of the retaining portions 46 engage the inboard wall 48 which acts as a stop to limit additional axial inward movement of the hub cap 14. The greater radial dimision of the inboard wall 52 insures the stop function.

In the attached position of the hub cap 14, it will be noted that the retaining portions 36 occupy substantially all of the retaining groove 44 and that the flange 34 and the rib 39 are supported in spaced relationship to the lip 43 of the recess 30.

To remove the hub cap 14 from the wheel 12, a tool having a wedged end, such as a screw driver or the like, can be inserted in the space between the lip 43 and bead 39. A prying action using the lip 43 as a fulcrum will permit a force to be applied against the surface 42 to pry the hub cap 14 axially outward. Such movement will cause the retaining portions 36 to move and to be deflected radially inwardly by the guide wall 50 until they clear the outboard surface 52, and move down the guide surfaces 54 as the hub cap 14 is moved axially out of the recess 30. It will be noted that the guide wall or surface 50 is at a slightly greater angle than the guide surface 54 and also that it is narrower. This insures that the necessary deflection of the retaining portions 36 can be obtained, but the greater angle and shorter distance upon removal insure that a greater force must be used to remove the hub cap than to attach it to the wheel 12 thereby avoiding accidental removal. In actual practice, the angle indicated at B in FIG. 2 of the outboard guide wall 50 has been made approximately thirty-five degrees with the axis of the wheel as opposed to twenty-five degrees for the guide surface 54.

A wheel and hub cap assembly has been provided in which a cast wheel is provided with guide surfaces acting to gradually deflect retaining portions upon relative axially movement of the hub cap and wheel so that the retaining portions can be guided into a retaining groove. The groove acts not only to contain the retaining portions, but also as a stop limiting the extent of axial movement of the hub cap relative to the wheel and establishing the relative positions. In the attached position, the hub cap is in contact with the walls of the groove and the remaining portions of the hub cap are maintained in spaced relationship to the wheel.

The embodiments of the invention in which an exclusive property or privilege is claimed are defined as follows:

1. A wheel and hub cap assembly comprising: a cast metal wheel including a tire mounting rim, a hub portion including wheel mounting holes uniformly spaced on a circle coaxial with said wheel, a generally disc-shaped spider portion extending between said tire mounting rim and said hub portion and formed integrally therewith, said hub portion forming an axially extending recess with a substantially cylindrical wall radially outwardly of said bolt circle and forming an access opening adjacent an outboard edge of said wheel, a continuous annular groove formed in said wall and opening radially inwardly relative to the axis of said wheel, said groove being disposed axially outwardly of said wheel mounting opening and axially inwardly of said access opening, a hub cap for closing said access opening, said hub cap having circumferentially spaced and radially extending resilient retaining elements disposed in said groove, a rigid guide surface between said groove and the outer end of said recess, said guide surface being adapted to engage said retaining elements for gradually deflecting the latter radially inwardly upon axial movement of said cap relative to said wheel to permit displacement of said retaining elements radially inwardly and entry into said groove upon attachment of said hub cap to said wheel, said retaining elements simultaneously engaging the axially inner and outer walls of said groove to limit axial inward and outward movement relative to said wheel and maintaining the remainder of said hub cap in close spaced relation to said access opening to substantially close said recess.

2. The combination of claim 1, wherein said guide surface has an axial length greater than the axial dimension of said retainers.

3. The combination of claim 2, wherein said guide surface converges radially inwardly as it approaches said annular groove at an angle with the axis of said wheel no greater than twenty-five degrees.

4. The combination of claim 3, wherein said groove has an angled guide wall formed at an axially outer edge of said groove and disposed at an angle with the axis of said wheel greater than the angle of said guide surface.

5. The combination of claim 4, wherein said angle of said guide wall is at least thirty-five degrees.

6. The combination of claim 1, wherein said annular groove has an annular wall at an axially inward edge of said groove to engage said retainer and limit axial inward movement of said hub cap.

7. The combination of claim 6, wherein said annular wall has a radial dimension greater than the depth of said annular groove adjacent to said guide wall.

* * * * *